United States Patent
McMullen et al.

(10) Patent No.: US 7,299,551 B2
(45) Date of Patent: Nov. 27, 2007

(54) METHOD OF ASSEMBLING A ROCKET ENGINE WITH A TRANSITION ZONE BETWEEN THE COMBUSTION CHAMBER AND THE COOLANT SYSTEM

(75) Inventors: Terrence J. McMullen, Palm Beach Gardens, FL (US); Gregg Jones, WPB, FL (US); Micki A. Marshall, Hobe Sound, FL (US); Donald R. Trenschel, Loxahatchee, FL (US)

(73) Assignee: United Technologies Corporation, Hartford, CT (US)

( * ) Notice: Subject to any disclaimer, the term of this patent is extended or adjusted under 35 U.S.C. 154(b) by 358 days.

(21) Appl. No.: 10/985,273

(22) Filed: Nov. 10, 2004

(65) Prior Publication Data
US 2005/0081510 A1    Apr. 21, 2005

Related U.S. Application Data

(62) Division of application No. 10/458,123, filed on Jun. 10, 2003, now Pat. No. 7,213,392.

(51) Int. Cl.
*B21D 53/00* (2006.01)
*F02K 9/00* (2006.01)

(52) U.S. Cl. .............. 29/890.01; 29/890.038; 60/266; 60/267

(58) Field of Classification Search ........ 29/890.01; 60/266, 267; 239/127.1, 127.3
See application file for complete search history.

(56) References Cited

U.S. PATENT DOCUMENTS

| | | | | |
|---|---|---|---|---|
| 3,224,678 A | * | 12/1965 | Rosman | 239/127.1 |
| 3,349,464 A | | 10/1967 | Becker Jr. et al. | |
| 3,630,449 A | * | 12/1971 | Butler | 239/127.1 |
| 3,897,316 A | | 7/1975 | Huang | |
| 3,910,039 A | | 10/1975 | Fortini | |
| 4,584,171 A | | 4/1986 | Niino et al. | |
| 4,703,620 A | | 11/1987 | Niino et al. | |
| 5,557,928 A | * | 9/1996 | Castro et al. | 60/260 |
| 5,903,976 A | | 5/1999 | Beaurain et al. | |
| 7,051,513 B2 | * | 5/2006 | McMullen et al. | 60/260 |

FOREIGN PATENT DOCUMENTS

| | | |
|---|---|---|
| EP | 0 720 876 A2 | 7/1996 |
| JP | 63-120842 | 5/1988 |
| JP | 2003-14235 | 1/2003 |
| WO | WO 02/055863 | 7/2002 |

* cited by examiner

*Primary Examiner*—David P. Bryant
*Assistant Examiner*—Sarang Afzali
(74) *Attorney, Agent, or Firm*—Bachman & LaPointe

(57) ABSTRACT

An improved engine construction, such as a rocket engine construction is provided. The engine construction comprises a combustion chamber, a smooth wall nozzle, and a transition zone between the chamber and the smooth wall nozzle. The transition zone has a coolant system which includes a manifold formed from a non-copper material through which a coolant flows. In a high heat transfer embodiment, the transition zone includes an additional manifold formed from a copper based material.

12 Claims, 4 Drawing Sheets

METHOD OF ASSEMBLING A ROCKET ENGINE WITH A TRANSITION ZONE BETWEEN THE COMBUSTION CHAMBER AND THE COOLANT SYSTEM

CROSS-REFERENCE TO RELATED APPLICATION(S)

This application is a divisional application of U.S. patent application Ser. No. 10/458,123, filed Jun. 10, 2003 now U.S. Pat. No. 7,213,392, entitled ROCKET ENGINE COMBUSTION CHAMBER, By Terrence J. McMullen et al.

BACKGROUND OF THE INVENTION

The present invention relates to a configuration of and a method of assembling a regenerative cooled tubular rocket engine combustion chamber and nozzle.

A rocket engine combustion chamber contains the combustion of pressurized fuel and oxidizer and the smooth acceleration of the combustion products to produce thrust. Referring now to FIG. 1, the oxidizer and fuel are introduced under pressure through an injector 10 attached to the top of the chamber 12. The combustion products under pressure advance to a de Laval nozzle 14 where the internal profile converges to a throat 16. Here, the expansion of the combustion products achieves sonic velocity. The convergent throat section is immediately followed by a divergent section 18. The combustion products are then further accelerated to many times the speed of sound depending on the profile of the divergent section, the oxidizer and fuel combination, the pressure of the combustion products and the external pressure. The acceleration of gases creates thrust for the rocket engine.

Regenerative cooled combustion chambers take part of the flow of cryogenic liquid propellant, usually fuel, to cool the walls of the combustion chamber. The coolant flows along the outside of the chamber through passages or tubes. The coolant recycles the waste heat to increase energy in the coolant. This increased energy in the coolant improves the efficiency of the cycle. Regenerative cooled combustion chambers for rocket engines typically fall into three categories: milled channel; platelet; and tubular construction.

In a milled channel construction, grooves of varying cross section are cut into the exterior of a liner, which assumes the shape of a de Laval nozzle. A jacket is then built up over the open channels or a cylindrical piece is slid on and vacuum compression brazed to the liner.

A platelet construction is similar to a milled channel but divides the length of the liner into many smaller sections, which are then bonded together. A multiple piece jacket is then welded together over the liner and vacuum compression brazed together.

A tubular construction combustion chamber can be manufactured in two ways depending on its size. If the chamber is large enough in diameter to allow access, the tubes and braze material can be laid directly into a single piece jacket and furnace brazed.

Assembly of smaller chambers starts by stacking forward tubes on a mandrel in the shape of a de Laval nozzle. The tubes can be laid straight along the length of the mandrel or can be spiral wrapped around the mandrel. The tube ends are inserted into an inlet and exit manifold. Braze wire, paste and foil is inserted into all the cavities between the tubes. The tubes contain the pressurized propellants for cooling the chamber walls and picking up waste heat to use in the cycle. A multiple piece jacket is then added to the outside of the tubes. The jacket segments are then welded together or overlapping strips are added between the jacket segments. The jackets and tubes are then furnace brazed together.

The tubular construction chamber yields the lightest and most efficient chamber due to the larger heat transfer area and lower stressed tube cross sections. The tubular construction chamber integrity depends on the quality of construction of the multiple piece jacket and braze coverage for all joints between the tubes, jacket segments, and manifolds.

The majority of the heat transfer between the combustion products and the coolant in the combustion chamber occurs from the injector face down past the throat to a few inches beyond the throat. It is here that the advantages of the tubular construction chamber are best used to increase the efficiency of the system. The point downstream of the throat where heat transfer between the coolant and chamber drops off, is the best place to split the assembly into a combustion chamber (upstream) and a nozzle (downstream) for manufacturing and assembly purposes. The nozzle can be of any smooth wall construction to reduce costs.

Smooth wall nozzles can be any of four types: milled channel; platelet; ablative; and radiation. The first two have been described above. The ablative nozzle employs a coating on the chamber internal profile that releases a cooling gas as it is heated by the combustion products. A radiation nozzle is made from a material that can take the heat input from the combustion products and give positive structural margin while only relying on radiation cooling.

Current engines use a regenerative cooled milled channel chamber and nozzle, a regenerative cooled milled channel chamber with a regenerative cooled tubular nozzle, or a combination all tubular construction chamber and nozzle.

The difficulty with incorporating a regeneratively cooled tubular chamber with a smooth wall nozzle lies in the transition zone between a tubular chamber wall profile and a smooth wall profile. Due to the very thin boundary layer of cooler gas flowing along the chamber profile, any sudden disturbance in the profile can lead to excessive temperatures locally in the wall and the generation of shocks. Higher temperatures reduce the material capability to withstand the internal coolant pressure loading and could lead to sudden failure. Shocks can lead to local pressure loading which can overload chamber wall material.

SUMMARY OF THE INVENTION

Accordingly, it is an object of the present invention to provide an assembly which allows a regenerative cooled tubular construction rocket engine chamber to be used with any smooth wall nozzle.

The foregoing object is attained by the assembly of the present invention.

In accordance with the present invention an improved engine, such as a rocket engine, is provided. The engine comprises a combustion chamber, a smooth wall nozzle, and a transition zone between the chamber and the smooth wall nozzle. The transition zone has a coolant system which includes a manifold formed from a non-copper material through which a coolant flows. In a high heat transfer embodiment, the transition zone includes an additional manifold formed from a copper based material.

A method of assembling a rocket engine combustion chamber having a combustion chamber, a smooth wall nozzle, and a coolant system with a transition zone between the combustion chamber and the nozzle is provided. The method comprises the steps of forming a transition zone by positioning at least one manifold having a plurality of holes on a mandrel, inserting braze preforms into the holes, inserting a plurality of tube assemblies into the holes, and furnace brazing the tube assemblies to the at least one manifold.

Other details of the rocket engine combustion chamber of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

The transition between a tubular flow path and a smooth wall flow path must be completed smoothly otherwise the heat input to the manifolds will reduce the material properties below minimum acceptable values for the stresses encountered. Part of this is to reduce any flow trips which could instigate heightened heat input to the manifolds.

Two configurations are described herein to achieve the ability to transition from a regenerative cooled tubular construction chamber profile to a smooth wall nozzle profile. The first configuration is a two piece manifold to counter very high heat transfer rates. The second configuration is a one piece manifold to counter lower heat transfer rates that permit a steel or nickel manifold.

The first configuration consists of tube assemblies with internal ferrules brazed to the tubes and paired manifolds. A leading edge manifold is made from a copper containing material, such as a copper based alloy containing greater than 50% by weight copper, and an aft manifold is made from a non-copper material, preferably steel or a nickel containing material, such as a nickel based alloy containing greater than 50% by weight nickel.

Figure 2:
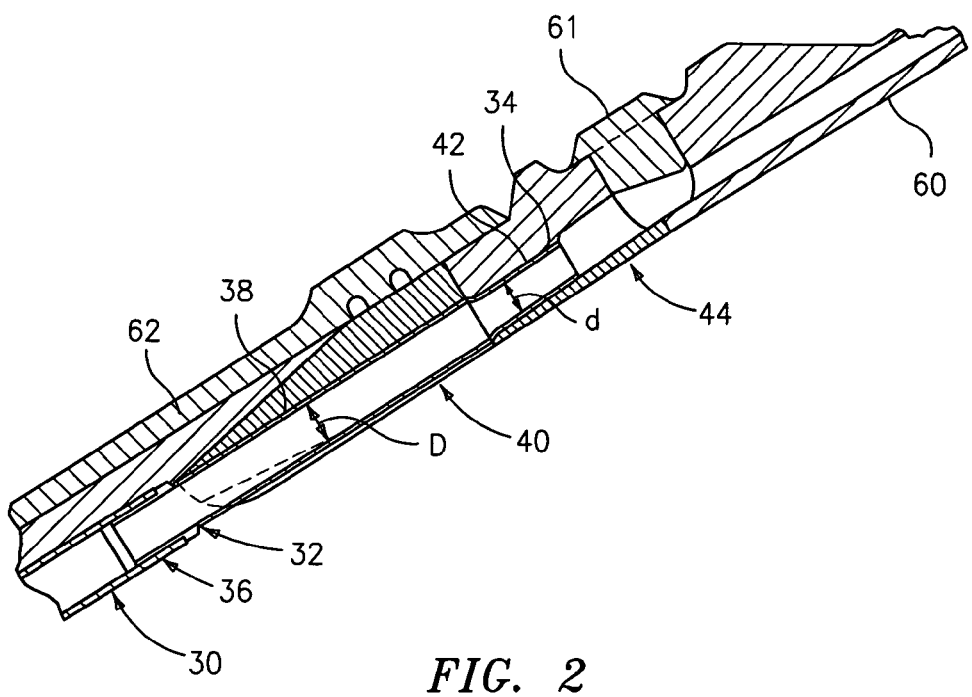
FIG. 2 is a cross section of a transition zone from a tubular profile to a smooth wall nozzle.
Figure 4:
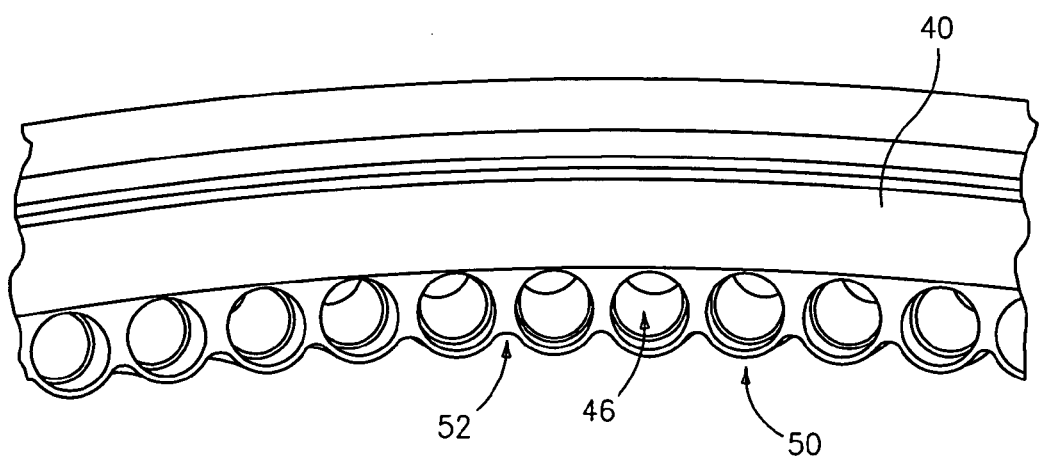
FIG. 4 is a view showing the leading edge of a leading edge manifold.
Figure 5:
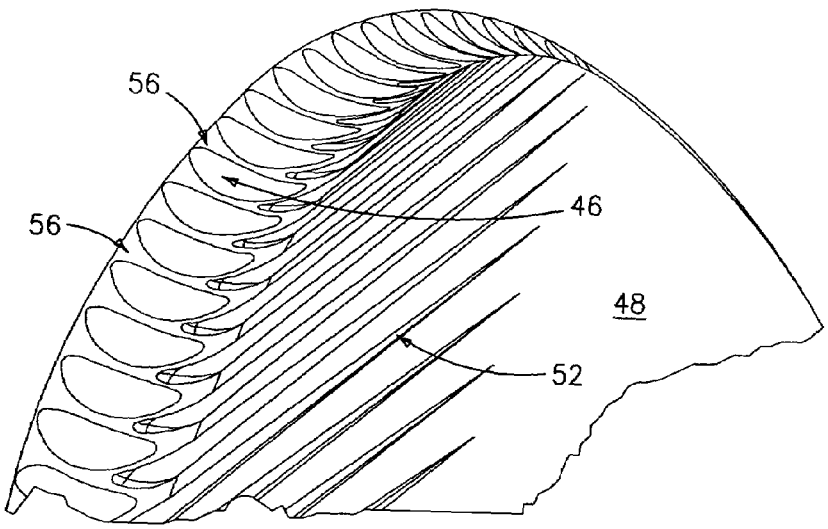
FIG. 5 is a view showing the radiused leading edge of the manifold of FIG. 4.
Figure 6:
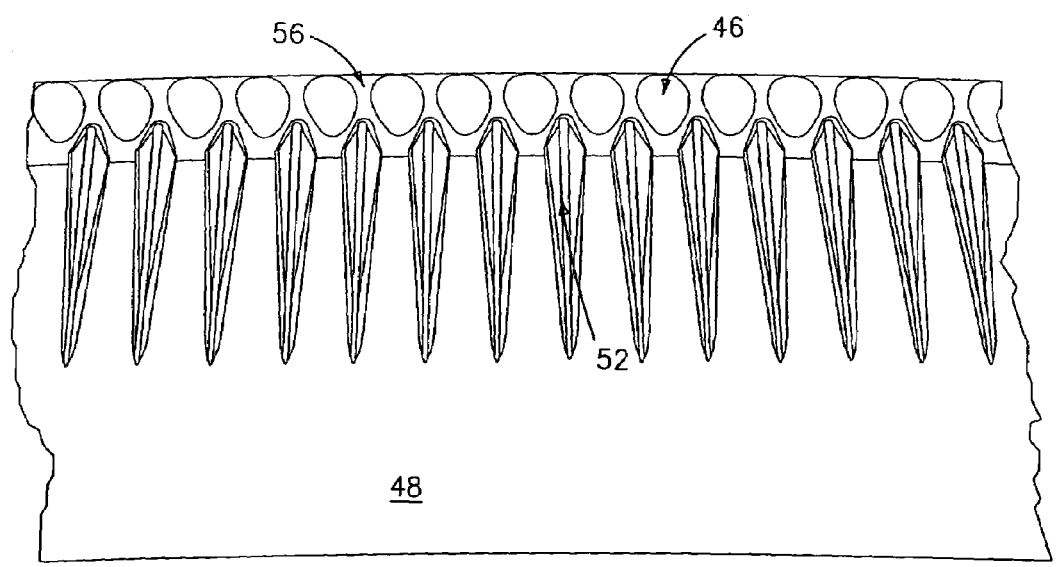
FIG. 6 is a bottom view looking at the flowpath side of the manifold of FIG. 4.

Referring now to FIG. 2, each tube assembly 30 has an internal ferrule 32, which is configured with a round cross section. The free end 34 of each ferrule 32 has a tiered diameter with the diameter d near the free end 34 being smaller than the diameter D near the tube 36. The large diameter D is sized for the braze gap 38 in the leading edge manifold 40 which is formed from the copper containing material. The smaller diameter d is sized for the braze gap 42 in the aft manifold 44. The use of the tiered internal ferrules 32 makes assembly of the ferrules end easier with less chance of damage.

Referring now to FIGS. 3 through 6, to counter the expected high heat input at the start of the transition zone, the leading edge manifold 40 is formed from the copper containing material. Copper has high conductivity to take the increased heat input on the leading edge of the transition zone. Holes 46 are drilled in the manifold to accept the ferrules 32. The smooth wall 48 on the manifold 40 is in line with the round cross section of each tube 30. This creates a waterfall effect for the expanding hot gas under the worst case tolerances. When the products of combustion advance down the chamber 12 and past the throat 16, the inside of the chamber has a constantly expanding diameter. When the flow comes to the interface between the tubes 30 and the manifold 32, the leading edge of the manifold flowpath must be sized so that its range of dimensional tolerances is always at a larger diameter than that of the tube crown surfaces upstream. This allows the combustion products to advance with the minimum of resistance and loss of energy. This is the waterfall effect. The opposite of the waterfall effect would be the dam effect. This would be when the manifold leading edge is at a small diameter than that of the tube crown surfaces upstream. The smaller diameter acts to block or interrupt the smooth flow of combustion products which results in localized heating and energy losses and the generation of shocks downstream.

On the upstream side of the interface there is the profile of the tube crowns and on the downstream side, there is the flowpath profile of the manifold 40. The two profiles are line on line under the best case tolerances. On the flow path side 50 of the manifold 40, grooves 52 are cut between the holes at an angle to the flow path to transition from the gullies between the tubes up to the flat wall profile 54. The leading edge 56 of the manifold 40 is radiused to smoothly transition into the grooves 52 in the manifold. The length of the grooves 52 depends on the chamber application. The arrangement described herein provides a smooth contour without any flow trips.

Behind the leading edge manifold 40 is a manifold 44 of non-copper material. As discussed above, preferred materials for the manifold 44 are steel or a nickel based alloy. The non-copper material used for the manifold 44 preferably has a higher strength than the material used for the manifold 40 to handle the coolant pressures at high flow path temperatures and the ability to be welded to the smooth wall nozzle 60 and structural jacket 62. There is also a splice plate 61 between the jacket 62 and the smooth wall nozzle 60 on the outside of the coolant passages. The splice plate is welded in place.

Figure 1:
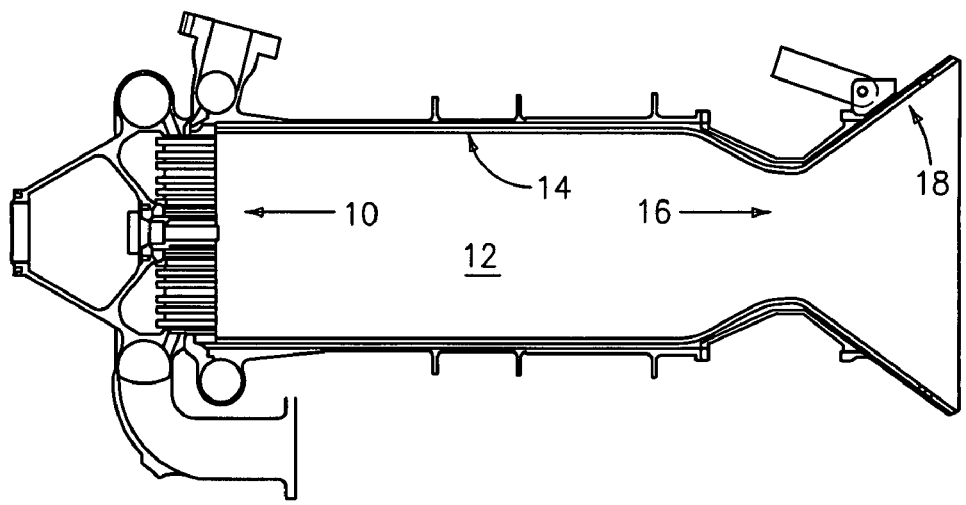
FIG. 1 illustrates a cross section of a typical tubular construction regenerative chamber.
Figure 3:
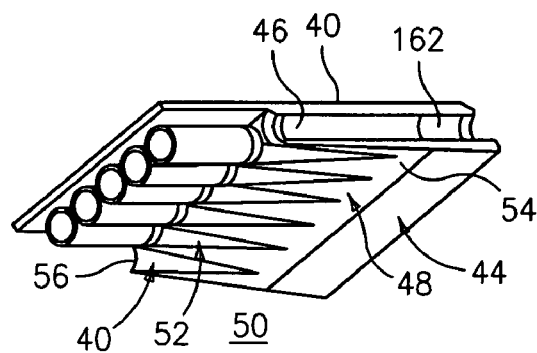
FIG. 3 is a view of a section of a joint.

As can be seen in FIGS. 2 and 3, the manifold 44 has a series of holes 162 to receive the free ends 34 of the ferrules 32. The holes 162 are smaller in diameter than the holes 46. The holes 162 have a length which is sufficient enough to accommodate any variation in ferrule end length.

The primary braze for the ferrules 32 to contain the blow off load of the coolant pressure is in the manifold 44. The aft manifold 44 and the ferrules 32 are also brazed to the leading edge manifold 40 to improve conductivity from the material forming the manifold 40 to the other materials and to prevent any leakage from the flow paths into the joint.

Figure 7:
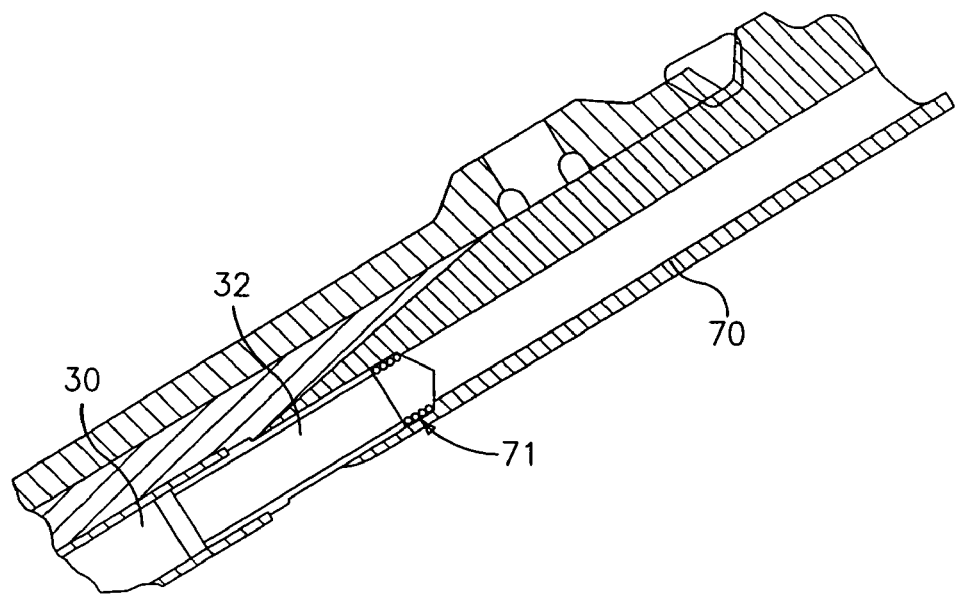
FIG. 7 is a cross section of the transition zone from tubular profile to a smooth wall profile.

The second configuration shown in FIG. 7 is for lower level heat transfer that permits use of a single manifold 70 formed from a non-copper material. In a preferred embodiment, the manifold 70 is formed from a single piece of steel or a nickel based alloy containing more than 50% nickel. The internal passages or holes and the grooves cut into the flow path of the manifold 70 are the same as for the first configuration. The method of installing the tube assemblies 30 with the internal ferrules 32 into the manifold 70 is the same as for the first configuration.

The method of assembly is the same for both of the above configurations. First, the manifold or manifolds are positioned on a mandrel. Braze preforms are then inserted into the holes in the manifold(s). The braze preforms may be formed from any suitable braze material known in the art. The braze preforms 71 are tubular in nature and have bores which allow the tube assemblies and the internal ferrules to be inserted into the manifold(s). The braze preforms 71 are helical coils of braze wire made to fit in the diameter of the manifold holes. The manifold holes are stepped to trap the braze preform 71 in place under the ferrules 32. Next, one by one insert the tube assemblies 30 into the manifold(s) until all of the tube assemblies have been inserted. Adjust the tubes profiles and gaps between tubes according to braze requirements. Furnace braze the manifold assembly after the opposite end of the tubes have been prepared for brazing. The jacket 62 can be included in the brazing process or added later after all repair brazing is completed. Inspect all braze joints for coverage and braze repair as required using any suitable means known in the art. Weld on the smooth wall nozzle 60 to seal the coolant passages. The nozzle 60 and the splice plate 61 close the coolant passages in the chamber so that the coolant passages in the nozzle flow through to the chamber without any leakage. By sealing the coolant passages, it is meant that coolant passages are confined within the bounds of the chamber, nozzle and splice plate by leak free welded structural joints.

The chamber is joined to the leading edge of the manifolds in several ways. The ferrules on the tube assemblies are brazed to the holes in the manifold. A coating 75 of material similar to the tube material is applied over the tubes 30 which also bonds to the outer surface of the manifold. The jacket 62 is then installed over the coating 75 and welded to the outer surfaces of the manifold. A later furnace braze operation joins the jacket 62 to the coating 75.

Figure 8:
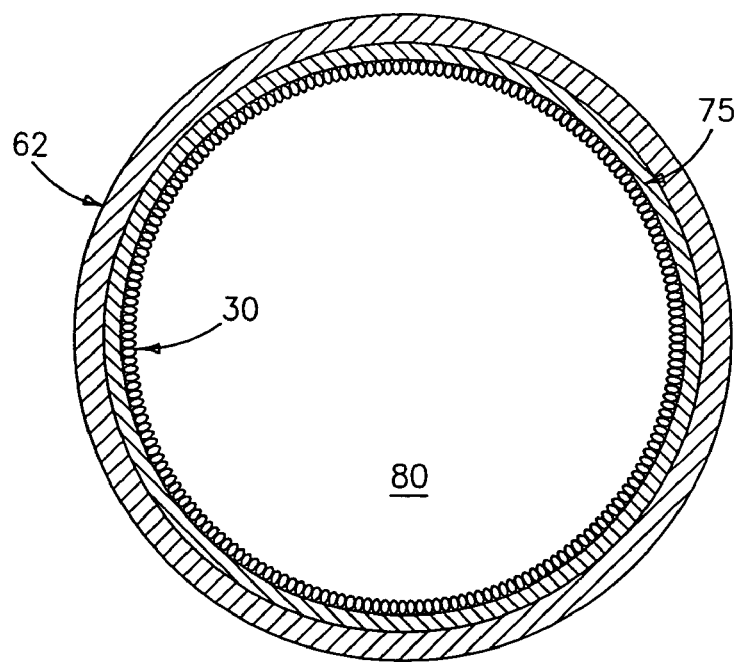
FIG. 8 is a cross section through a regeneratively cooled tubular rocket engine combustion chamber.

In accordance with the present invention, referring to FIG. 8, a rocket engine configuration using a regenerative cooled tubular construction rocket engine chamber 80 and a smooth wall nozzle is provide while satisfying assembly and system requirements of an engine cycle without producing flow path shocks or overheating of the chamber walls at the joint.

It is apparent that there has been provided in accordance with the present invention a rocket engine combustion chamber which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A method of assembling a rocket engine having a combustion chamber, a smooth wall nozzle, and a coolant system with a transition zone between said combustion chamber and said nozzle, the method comprising the steps of:

forming the transition zone by providing a first manifold having a plurality of holes and a plurality of grooves cut between adjacent ones of said holes for transitioning from gullies between external surfaces of said holes to a flat wall profile;

inserting braze performs into said holes;

inserting a plurality of tube assemblies into the holes; and furnace brazing the tube assemblies to the first manifold.

2. A method according to claim 1, wherein said providing step comprises providing a first manifold formed from a non-copper material.

3. A method according to claim 1, wherein said providing step comprises providing a second manifold formed from a non-copper material and providing a first manifold formed from a copper based material and joining said first manifold to said second manifold.

4. A method according to claim 1, further comprising welding said nozzle on said first manifold.

5. A method according to claim 1, further comprising joining said combustion chamber to said coolant system.

6. A method for assembling a rocket engine having a combustion chamber, a smooth wall nozzle, and a coolant system with a transition zone between said combustion chamber and said nozzle, the method comprising the steps of:

forming the transition zone by providing a first manifold having a first set of holes and a second manifold having a second set of holes;

aligning said first manifold relative to said second manifold so that said first set of holes are aligned with said second set of holes;

inserting braze preforms into said first and second set of holes;

providing a plurality of tube assemblies with each of said tube assemblies having an internal ferrule with a free end;

inserting each said internal ferrule into a respective one of said first holes so that said internal ferrule passes through said first manifold and into a respective one of said second holes so that said free end terminates in said second manifold; and brazing said internal ferrule to said first and second manifolds by melting said braze preforms.

7. The method according to claim 6, wherein said first and second manifold providing step comprises providing a first manifold formed from a copper based material and a second manifold formed from a non-copper material.

8. The method according to claim 6, wherein said second manifold providing step comprises providing a manifold formed from steel.

9. The method according to claim 6, wherein said second manifold providing step comprises providing a manifold formed from a nickel based alloy containing greater than 50% by weight nickel.

10. The method according to claim 6, wherein said tube assembly providing step comprises providing a tube assembly having a tiered configuration with a diameter near the free end being smaller than a diameter of the internal ferrule in the first manifold.

11. The method according to claim 6, further comprising welding the smooth wall nozzle to seal coolant passages.

12. The method according to claim 6, further comprising joining the combustion chamber to said coolant system.

* * * * *